(12) United States Patent
Shimamura et al.

(10) Patent No.: US 10,891,292 B2
(45) Date of Patent: Jan. 12, 2021

(54) DATABASE MANAGEMENT SYSTEM AND DATABASE MANAGEMENT METHOD

(71) Applicant: Kabushiki Kaisha Toshiba, Minato-ku (JP)

(72) Inventors: Makoto Shimamura, Kawasaki (JP); Mototaka Kanematsu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 26 days.

(21) Appl. No.: 16/082,522

(22) PCT Filed: Mar. 6, 2018

(86) PCT No.: PCT/JP2018/008523
§ 371 (c)(1),
(2) Date: Sep. 5, 2018

(87) PCT Pub. No.: WO2018/225314
PCT Pub. Date: Dec. 13, 2018

(65) Prior Publication Data
US 2020/0019551 A1    Jan. 16, 2020

(30) Foreign Application Priority Data
Jun. 5, 2017   (JP) .................................. 2017-111076

(51) Int. Cl.
*G06F 16/2455* (2019.01)
*G06F 16/2458* (2019.01)
(Continued)

(52) U.S. Cl.
CPC .......... *G06F 16/2455* (2019.01); *G06F 9/355* (2013.01); *G06F 16/2282* (2019.01);
(Continued)

(58) Field of Classification Search
None
See application file for complete search history.

(56) References Cited

U.S. PATENT DOCUMENTS 6,438,562 B1 * 8/2002 Gupta ................. G06F 16/2272
707/696
7,917,495 B1 * 3/2011 Chapman .......... G06F 16/24532
707/713
(Continued)

FOREIGN PATENT DOCUMENTS

JP   2000-347912        12/2000
JP   2007-323394 A      12/2007
(Continued)

OTHER PUBLICATIONS

International Search Report dated Jun. 12, 2018, in PCT/JP2018/008523 filed Mar. 6, 2018.

*Primary Examiner* — Robert W Beausoliel, Jr.
*Assistant Examiner* — Cheryl M Shechtman
(74) *Attorney, Agent, or Firm* — Obion, McClelland, Maier & Neustadt, L.L.P.

(57) ABSTRACT

A database management system according to an embodiment includes a first node and a plurality of second nodes. The first node receives a query for requesting data from a client terminal and transmits the received query to any one of a plurality of second nodes in accordance with conditions. The plurality of second nodes acquire data by performing processing based on the query received from the first node and transmit the acquired data to the first node. The first node holds range information indicating a range of data held in each of the second nodes and does not transmit the query to the second nodes when the range of data to be retrieved for the query is not a range indicated by the range information.

9 Claims, 12 Drawing Sheets

(51) Int. Cl.
*G06F 9/355* (2018.01)
*G06F 16/958* (2019.01)
*G06F 16/22* (2019.01)
*G06F 16/2453* (2019.01)

(52) U.S. Cl.
CPC ...... *G06F 16/2462* (2019.01); *G06F 16/2471* (2019.01); *G06F 16/24549* (2019.01); *G06F 16/958* (2019.01)

(56) References Cited

U.S. PATENT DOCUMENTS

| | | | |
|---|---|---|---|
| 2011/0320758 A1* | 12/2011 | Craddock | G06F 12/0292 |
| | | | 711/206 |
| 2013/0054727 A1* | 2/2013 | Kumano | G06F 3/0631 |
| | | | 709/212 |
| 2014/0222873 A1* | 8/2014 | Nakadai | G06F 16/2282 |
| | | | 707/803 |
| 2016/0203180 A1 | 7/2016 | Hanai et al. | |
| 2017/0277752 A1 | 9/2017 | Oyamada | |

FOREIGN PATENT DOCUMENTS

| | | |
|---|---|---|
| JP | 2015-170239 A | 9/2015 |
| WO | WO 2016/027451 A1 | 2/2016 |

* cited by examiner

FIG. 5

| UPDATE TIME | TEMPORARY MAXIMUM VALUE | TEMPORARY MINIMUM VALUE | NUMBER OF PRECISION IGNORING BITS n |
|---|---|---|---|
| 2017/3/14 20:29:41 | 1101000000000000 | 0000000000000000 | 11 |
| 2017/3/14 20:25:31 | 1101010000000000 | 0000000000000000 | 10 |
| ... | ... | ... | ... |

T3

DATABASE MANAGEMENT SYSTEM AND DATABASE MANAGEMENT METHOD

TECHNICAL FIELD

An embodiment of the present invention relates to a database management system and a database management method.

BACKGROUND ART

In the related art, distributed database management systems which include upper nodes configured to receive queries from client terminals and a plurality of lower nodes configured to acquire data by performing processes based on the queries received by upper nodes are known. Lower nodes transmit data obtained by performing processes based on queries to upper nodes and upper nodes transmit the data received from lower nodes to client terminals that are transmission sources of the queries.

However, in database management systems, a load of processing in lower nodes then increases and thus the performance of the database management systems deteriorates in some cases.

CITATION LIST

Patent Literature

[Patent Literature 1]
PCT International Publication No. WO2016/027451
[Patent Literature 2]
Japanese Unexamined Patent Application, First Publication No. 2015-170239

SUMMARY OF INVENTION

Technical Problem

An objective to be achieved by the present invention is to provide a database management system and a database management method capable of preventing this deterioration of performance.

Solution to Problem

A database management system according to an embodiment includes a first node and a plurality of second nodes. The first node receives a query for requesting data from a client terminal and transmits the received query to any one of a plurality of second nodes in accordance with conditions. The plurality of second nodes acquire data by performing processing based on the query received from the first node and transmit the acquired data to the first node. The first node holds range information indicating a range of data held in each of the second nodes and does not transmit the query to the second nodes when the range of data to be retrieved for the query is not a range indicated by the range information.

BRIEF DESCRIPTION OF DRAWINGS

FIG. 5 is a diagram illustrating an example of a table T3 (index update history) stored in the storage 350 according to the first embodiment.

DESCRIPTION OF EMBODIMENTS

A database management system and a database management method according to an embodiment will be described below with reference to the drawings.

First Embodiment

Figure 1:
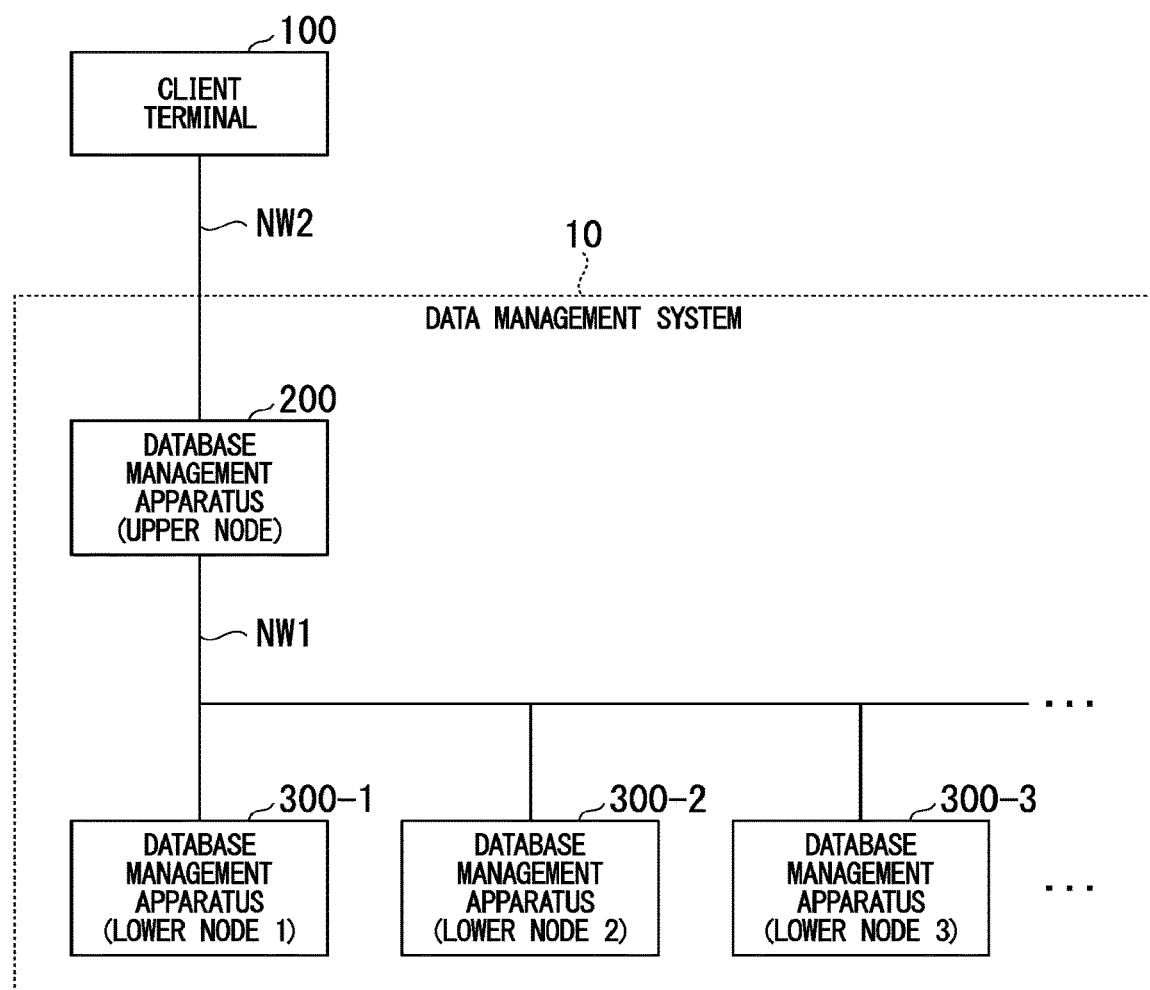
FIG. 1 is a block diagram showing an overall constitution of a database management system 10 according to a first embodiment.

FIG. 1 is a block diagram showing an overall constitution of a database management system 10 according to a first embodiment. The database management system 10 includes a database management apparatus 200 (hereinafter referred to as a "upper node") and a plurality of database management apparatuses 300 (hereinafter referred to as "lower nodes"). In FIG. 1, three lower nodes 300-1, 300-2, and 300-3 are illustrated, but the number of lower nodes is not limited thereto. For example, the database management system 10 may include four or more lower nodes 300.

An upper node 200 is connected to the plurality of lower nodes 300-1 to 300-3 via a network NW1. The network NW1 includes some or all of, for example, a wide area network (WAN), a local area network (LAN), the Internet, a provider apparatus, a radio base station, a dedicated line, and the like.

A client terminal 100 is connected to the upper node 200 via a network NW2. The network NW2 includes some or all of, for example, a WAN, a LAN, the Internet, a provider apparatus, a radio base station, a dedicated line, and the like.

The client terminal 100 is a computer configured to be used by a user and to transmit a query requesting data to the upper node 200. The client terminal 100 is a desktop type computer, but the present invention is not limited thereto.

For example, the client terminal 100 may be a notebook type computer, a tablet terminal, or a personal digital assistant (PDA).

The upper node 200 is a computer configured to receive a query from the client terminal 100. The upper node 200 is a desktop type computer, but the present invention is not limited thereto. For example, the upper node 200 may be a notebook type computer, a tablet terminal, or a PDA.

The lower nodes 300-1, 300-2, and 300-3 are computers configured to execute processing based on a query received by the upper node 200 and to acquire data. The lower nodes 300-1, 300-2, and 300-3 are desktop type computers, but are not limited thereto. For example, the lower nodes 300-1, 300-2, and 300-3 may be notebook type computers, tablet terminals, or PDAs.

Figure 2:
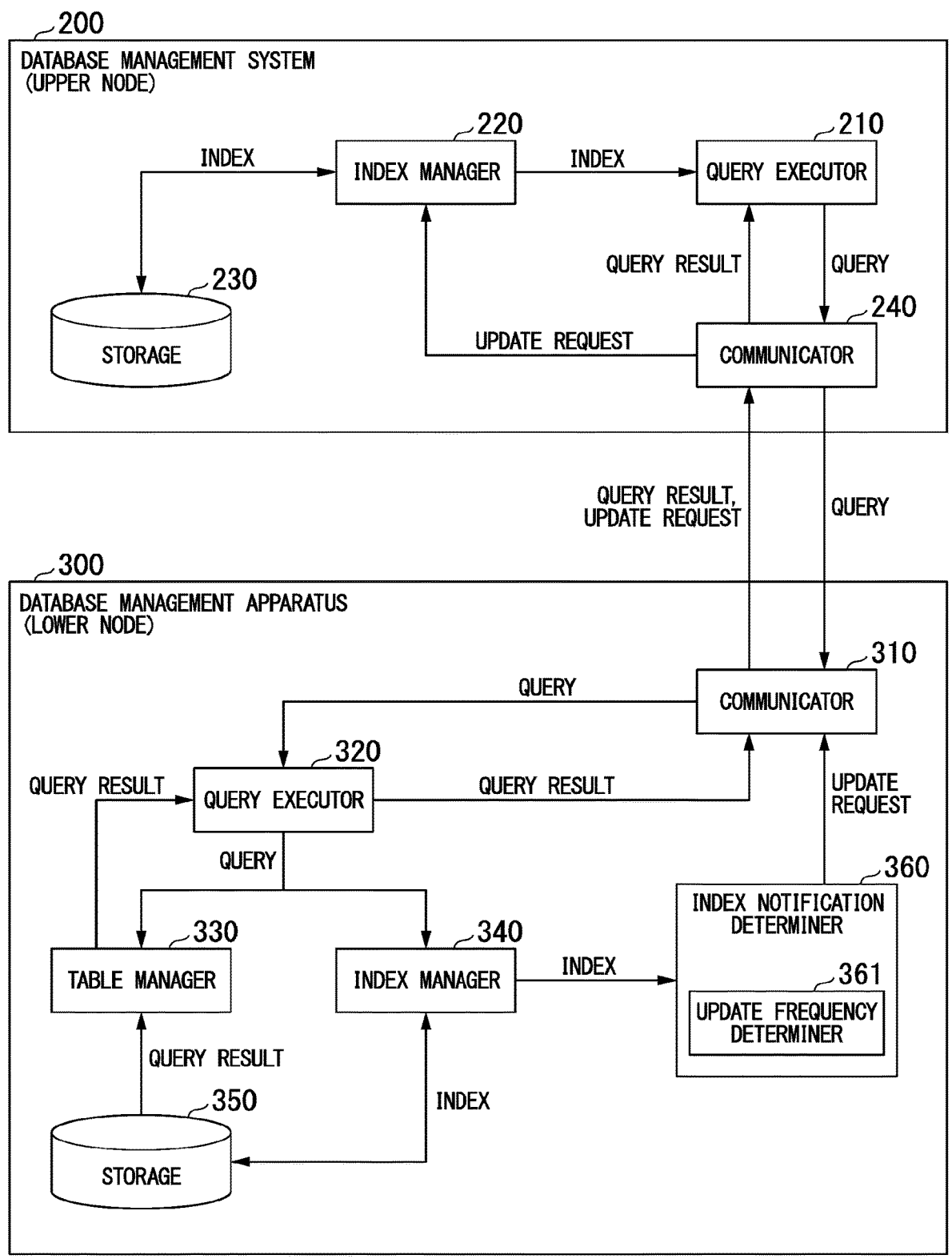
FIG. 2 is a block diagram for explaining an operation of an upper node 200 and lower nodes 300 according to the first embodiment.

FIG. 2 is a block diagram for explaining an operation of the upper node 200 and the lower nodes 300 according to the first embodiment. Since the lower nodes 300-1, 300-2, and 300-3 perform the same operation, they are collectively referred to as the lower nodes 300 in FIG. 2.

The upper node 200 includes a query executor 210, an index manager 220, a storage 230, and a communicator 240. The query executor 210 and the index manager 220 are realized when a processor such as a central processing unit (CPU) executes a program stored in the storage 230. It should be noted that the query executor 210 and the index manager 220 may be realized using hardware such as a large scale integration (LSI), an application specific integrated circuit (ASIC), and a field-programmable gate array (FPGA) which have the same functions as the program to be executed by the processor.

The storage 230 is realized using, for example, a random access memory (RAM), a read only memory (ROM), a hard disk drive (HDD), a flash memory, a hybrid type storage apparatus obtained by combining at least two of these, or the like. Furthermore, a part or all of the storage 230 may be an external apparatus which can be accessed by the upper node 200 such as a network attached storage (NAS) or an external storage server. The communicator 240 may be realized using, for example, a network interface card (NIC).

Each of the lower nodes 300 includes a communicator 310, a query executor 320, a table manager 330, an index manager 340, a storage 350, and an index notification determiner 360. The query executor 320, the table manager 330, the index manager 340, and the index notification determiner 360 are realized when a processor such as a CPU executes a program stored in the storage 350. It should be noted that the query executor 320, the table manager 330, the index manager 340, and the index notification determiner 360 may be realized using hardware such as a LSI, an ASIC, and a FPGA which have the same functions as the program to be executed by the processor.

The communicator 310 is realized using, for example, an NIC. The storage 350 is realized using, for example, a RAM, a ROM, an HDD, a flash memory, a hybrid type storage apparatus obtained by combining at least two of these, or the like. Furthermore, a part or all of the storage 350 may be an external apparatus which can be accessed by the lower nodes 300 such as a NAS or an external storage server.

For example, data (sensor value) output from a sensor (not shown) is accumulated in the storage 350. Data stored in the storage 350 is not limited to a sensor value and may be any data. The storage 350 stores data in a table format.

Figure 3:
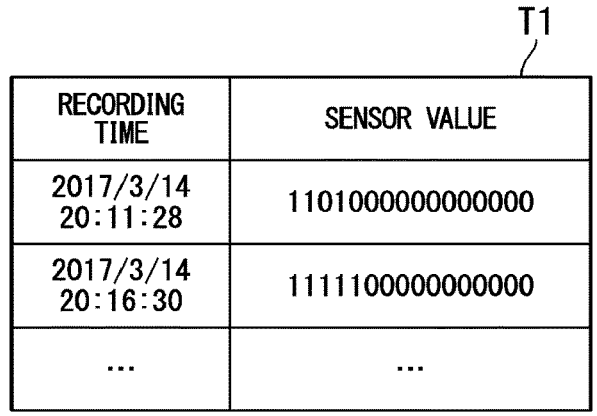
FIG. 3 is a diagram illustrating an example of a table T1 stored in a storage 350 according to the first embodiment.

FIG. 3 is a diagram illustrating an example of a table T1 stored in the storage 350 according to the first embodiment. The table T1 is a table in which a recording time and a sensor value are associated with each other. A recording time is a time at which a sensor value is recorded in the storage 350.

The storage 350 adds a record in which a recording time and a sensor value are associated with each other to the table T1 each time the sensor value is input. When the number of records included in the table T1 reaches a predetermined upper limit value, a record with the oldest record time is deleted from the table T1.

On the other hand, an index of each of the plurality of lower nodes 300 is stored in the storage 230 in the upper node 200 in a table format. The index is range information indicating a range of data held in each of the lower nodes 300.

Figure 4:
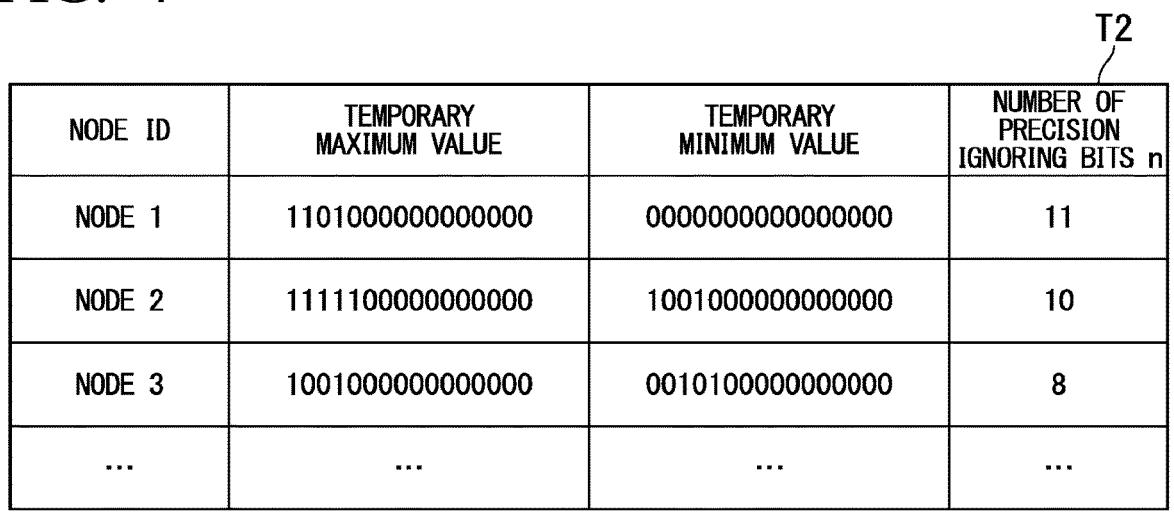
FIG. 4 is a diagram illustrating an example of a table T2 (index) stored in a storage 230 according to the first embodiment.

FIG. 4 is a diagram illustrating an example of a table T2 (index) stored in the storage 230 according to the first embodiment. The table T2 is a table in which a node ID, a temporary maximum value, a temporary minimum value, and the number of precision ignoring bits n are associated with each other.

The node ID is identification information for identifying each of the lower nodes 300. The temporary maximum value is information indicating a temporary maximum value of data stored in the lower node 300. The temporary minimum value is information indicating a temporary minimum value of data stored in the lower node 300. The number of precision ignoring bits n is a value used in rounding processing to be executed when the temporary maximum value and the temporary minimum value are calculated. The details thereof will be described later, but in the rounding processing, a temporary maximum value is obtained by carrying up a value of low-order n bits of a maximum value to a $(n+1)^{th}$ bit and a temporary minimum value is obtained by rounding down a value of low-order n bits of a minimum value.

First, query processing will be described. When the upper node 200 receives a query from the client terminal 100, the query executor 210 outputs an index request for requesting an index of the lower node 300 to the index manager 220. The index manager 220 reads the table T2 (index) from the storage 230 on the basis of the index request input from the query executor 210. Subsequently, the index manager 220 outputs the index read from the storage 230 to the query executor 210.

The query executor 210 determines whether at least a part of a range of data to be retrieved for the query is included in a range of data held in each of the lower nodes 300 with respect to each of the plurality of lower nodes 300 on the basis of the index input from the index manager 220. To be specific, the query executor 210 determines whether at least a part of the range of data to be retrieved for the query is included in a range of the temporary minimum value or more and the temporary maximum value or less included in the index.

The query executor 210 does not output a query to the communicator 240 when it is determined that the at least a part of the range of data to be retrieved for the query is not included in the range of data held in the lower node 300. For this reason, the communicator 240 does not transmit the query to the lower nodes 300. Thus, since it is possible to prevent a lower node 300 which does not hold data to be retrieved for the query from performing a query, it is possible to reduce a load on processing in the lower nodes 300.

On the other hand, the query executor 210 outputs a query to the communicator 240 when it is determined that the at least a part of the range of data to be retrieved for the query is included in the range of data held in the lower node 300.

The communicator 240 transmits the query input from the query executor 210 to the lower node 300.

When receiving a query from the upper node 200, the communicator 310 in the lower node 300 outputs the received query to the query executor 320. The query executor 320 outputs the query input from the communicator 310 to the table manager 330 and the index manager 340.

The table manager 330 acquires a query result from the storage 350 on the basis of the query input from the query executor 320. To be specific, the table manager 330 acquires a record in which a sensor value is included in a range of a query to be retrieved from the table T1 (FIG. 3) stored in the storage 350. The table manager 330 outputs the record acquired from the table T1 to the query executor 320 as a query result.

The query executor 320 outputs the query result input from the table manager 330 to the communicator 310. The communicator 310 transmits the query result input from the query executor 320 to the upper node 200.

The communicator 240 in the upper node 200 outputs the query result transmitted from the lower nodes 300 to the query executor 210. When receiving query results from all of the lower nodes 300 serving as a transmission destination of a query, the query executor 210 performs merge processing on the plurality of received query results. Thus, the plurality of query results are integrated.

The query executor 210 outputs the integrated query result to the communicator 240. The communicator 240 transmits the query result input from the query executor 210 to the client terminal 100. A flow sequence of the query processing is as described above.

Next, index update processing will be described. Each time a sensor value is input from a sensor (not shown), a record including the sensor value is added to the table T1 in the storage 350. When a record is added to the table T1 to update a maximum value or a minimum value of a sensor value, the index manager 340 updates an index of the lower node 300. In the storage 350 in the lower node 300, an index update history of the lower node 300 is stored in a table format.

FIG. 5 is a diagram illustrating an example of a table T3 (index update history) stored in the storage 350 according to the first embodiment. The table T3 is a table in which an update time, a temporary maximum value, a temporary minimum value, and the number of precision ignoring bits n are associated with each other. The update time is information indicating a time at which an index (temporary maximum value, temporary minimum value, and number of precision ignoring bits n) is updated.

As rounding processing, the index manager 340 calculates a temporary maximum value by carrying up low-order n bits of a maximum value of a sensor value stored in the storage 350 and calculates a temporary minimum value by rounding down low-order n bits of a minimum value of a sensor value stored in the storage 350.

For example, when a maximum value of a sensor value is 11010101 and the number of precision ignoring bits n is 5 bits, the index manager 340 calculates a value obtained by carrying up lower-ordered 5 bits to a $6^{th}$ bit (11100000) as a temporary maximum value. Furthermore, for example, when a minimum value of a sensor value is 00110100 and the number of precision ignoring bits n is 5 bits, the index manager 340 calculates a value obtained by truncating the lower-ordered 5 bits (00100000) as a temporary minimum value.

Subsequently, the index manager 340 outputs the calculated temporary maximum value and temporary minimum value to the index notification determiner 360 together with the number of precision ignoring bits n. The index notification determiner 360 determines whether the temporary maximum value and the temporary minimum value input from the index manager 340 are different from the previously calculated temporary maximum value and temporary minimum value with reference to the table T3.

The index notification determiner 360 outputs an update request including a node ID of the lower node 300, the currently calculated temporary maximum value and temporary minimum value, and the number of precision ignoring bits n to the communicator 310 when it is determined that the temporary maximum value and the temporary minimum value input from the index manager 340 are different from the previously calculated temporary maximum value and temporary minimum value. The communicator 310 transmits the update request input from the index notification determiner 360 to the upper node 200.

When receiving an update request from the lower nodes 300, the communicator 240 in the upper node 200 outputs the received update request to the index manager 220. The index manager 220 updates a record of the table T1 corresponding to the node ID included in the update request input from the communicator 240 using the temporary maximum value, the temporary minimum value, and the number of precision ignoring bits n included in the update request. Thus, the table T1 is updated.

When the update of the table T1 is completed, the index manager 220 outputs an update completion notification to the communicator 240. The communicator 240 transmits the update completion notification input from the index manager 220 to the lower node 300.

When receiving an update completion notification from the upper node 200, the communicator 310 in the lower node 300 outputs the received update completion notification to the index notification determiner 360. The index notification determiner 360 outputs an update request for updating the table T3 to the index manager 340 when receiving the update completion notification from the communicator 310.

The index manager 340 adds a record including an update time, currently calculated temporary maximum value and temporary minimum value, and the number of precision ignoring bits n to the table T3 when receiving the update request from the index notification determiner 360 as an input. Thus, the table T3 is updated. When the number of records included in the table T3 reaches a predetermined upper limit value, a record with the oldest update time is deleted from the table T3.

Figure 6:
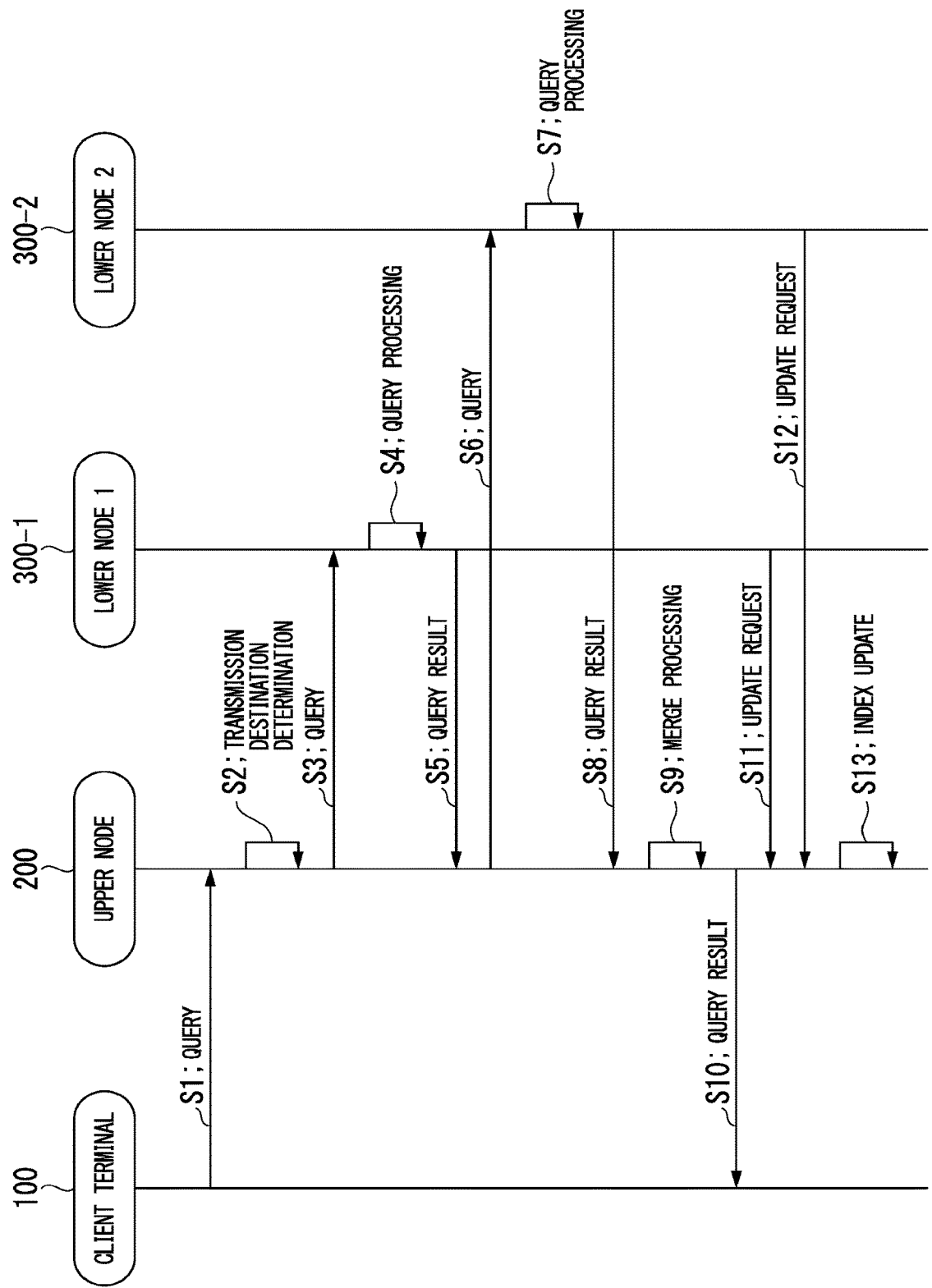
FIG. 6 is a sequence diagram for describing query processing according to the first embodiment.

FIG. 6 is a sequence diagram for describing the query processing according to the first embodiment. FIG. 6 illustrates an example in which the upper node 200 transmits a query to the lower nodes 300-1 and 300-2.

First, the client terminal 100 transmits a query to an upper node in accordance with a user's operation (S1). The upper node 200 determines a transmission destination of the query received from the client terminal 100 (S2). As described above, the upper node 200 acquires an index of each of the lower nodes 300 from the table T2 stored in the storage 230. Subsequently, the upper node 200 determines the transmission destination of the query on the basis of a range of data to be retrieved for the query and the index of each of the lower nodes 300. FIG. 6 illustrates an example in which the upper node 200 determines that the transmission destination of the query is the lower nodes 300-1 and 300-2.

The upper node 200 transmits the query to the lower node 300-1 (S3). The lower node 300-1 performs the query processing when receiving the query from the upper node 200 (S4). As described above, the lower node 300-1 acquires a query result (data to be retrieved for the query) from the table T1 stored in the storage 350 when the query processing is performed. Subsequently, the lower node 300-1 transmits the query result to the upper node 200 (S5).

Also, the upper node 200 transmits the query to the lower node 300-2 (S6). The lower node 300-2 performs the query processing when receiving the query from the upper node 200 (S7). As described above, the lower node 300-2 acquires a query result (data to be retrieved for the query) when the query processing is performed. Subsequently, the lower node 300-2 transmits the query result to the upper node 200 (S8).

The upper node 200 performs merge processing on the query result received from the lower node 300-1 and the query result received from the lower node 300-2 (S9). Thus, the query result received from the lower node 300-1 and the query result received from the lower node 300-2 are integrated. Subsequently, the upper node 200 transmits the integrated query result to the client terminal 100 (S10).

On the other hand, the lower node 300-1 determines whether it is necessary to update a temporary maximum value and a temporary minimum value. The lower node 300-1 transmits an update request including a node ID of the lower node 300-1, the temporary maximum value, the temporary minimum value, and the number of precision ignoring bits n to an upper node when it is determined that it is necessary to update the temporary maximum value and the temporary minimum value (S11).

Also, the lower node 300-2 determines whether it is necessary to update a temporary maximum value and a temporary minimum value. The lower node 300-2 transmits a node ID of the lower node 300-2, the temporary maximum value, the temporary minimum value, and the number of precision ignoring bits n to an upper node when it is determined that it is necessary to update the temporary maximum value and the temporary minimum value (S12).

The upper node 200 updates the table T2 (index) stored in the storage 230 on the basis of the update request received from the lower nodes 300-1 and the update request received from the lower nodes 300-2 (S13).

When the update of the table T2 (index) is completed, the upper node 200 transmits an update completion notification to the lower nodes 300-1 and 300-2. The lower node 300-1 updates the table T3 (index update history) stored in the storage 350 in accordance with the update completion notification received from the upper node 200. The lower node 300-1 also updates the table T3 (index update history) in accordance with the update completion notification received from the upper node 200.

It should be noted that an update timing of T3 (index update history) is not limited thereto. For example, after the update of the table T3 (index update history) is completed, the lower nodes 300-1 and 300-2 may transmit an update request to the client terminal 100.

Also, the index notification determiner 360 includes an update frequency determiner 361 configured to determine an index update frequency. The index notification determiner 360 determines whether to increase or decrease the number of precision ignoring bits n on the basis of the index update frequency determined by the update frequency determiner 361. The details of this will be described later.

Figure 7:
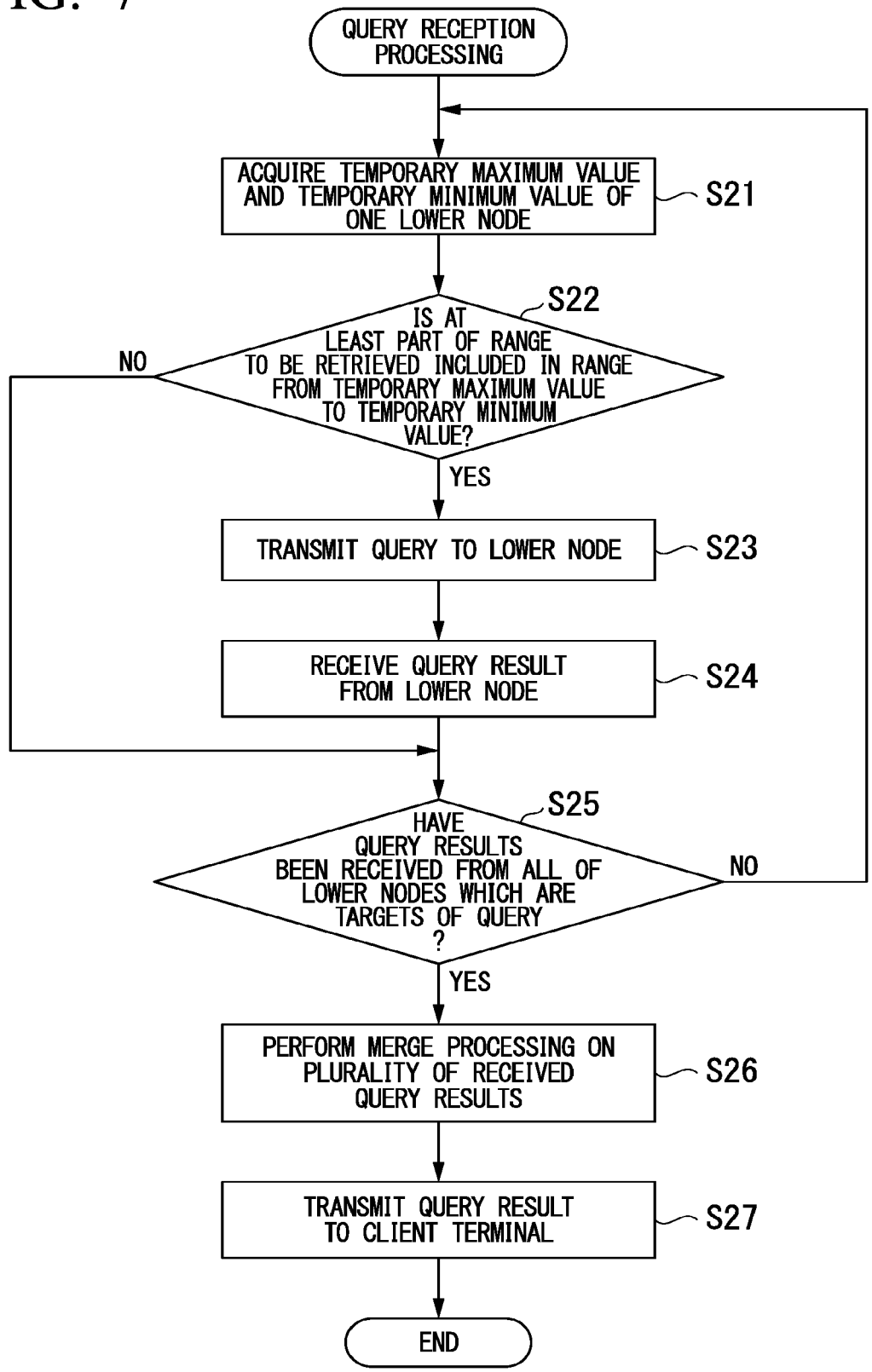
FIG. 7 is a flowchart for describing details of query reception processing according to the first embodiment.

FIG. 7 is a flowchart for describing details of query reception processing according to the first embodiment. The query reception processing illustrated in FIG. 7 is performed by the upper node 200 when the upper node 200 receives the query from the client terminal 100.

First, the upper node 200 acquires a temporary maximum value and a temporary minimum value of one lower node 300 among the plurality of lower nodes 300 connected to the upper node 200 from the table T2 stored in the storage 230 (S21). Subsequently, the upper node 200 determines whether at least a part of a range of data to be retrieved for the query received from the client terminal 100 is included in a range from the temporary maximum value to the temporary minimum value acquired in S21 (S22).

The process of the upper node 200 proceeds to a process of S25 which will be described later when it is determined that the at least a part of the range of a query to be retrieved is not included in the range from the temporary maximum value to the temporary minimum value acquired in S21. On the other hand, the upper node 200 transmits the query to the lower node 300 having the temporary maximum value and the temporary minimum value used for the determination when it is determined that the at least a part of the range of a query to be retrieved is included in the range from the temporary maximum value to the temporary minimum value acquired in S21 (S23).

The lower node 300 which has received the query from the upper node 200 acquires a query result by executing the query processing. The lower node 300 transmits the query result to the upper node 200. Subsequently, the upper node 200 receives the query result from the lower node 300 (S24).

Subsequently, the upper node 200 determines whether query results have been received from all of the lower nodes 300 which are targets of a query (S25). When it is not determined that the upper node 200 has received the query results from all of the lower nodes 300 which are targets of a query, the process returns to the above-described process of S21.

On the other hand, the upper node 200 performs merge processing on the plurality of received query results when it is determined that the query results have been received from all of the lower nodes 300 which are the targets of the query (S26). Thus, the plurality of query results are integrated. Subsequently, the upper node 200 transmits the integrated query result to the client terminal 100 (S27) and the process according to this flowchart ends.

In this way, the upper node 200 can narrow down candidates for lower nodes 300 which hold data to be retrieved for the query using an index (temporary maximum value and temporary minimum value). For this reason, it is possible to prevent a lower node 300 which does not hold data to be retrieved for the query from performing the query processing (false positive) and it is possible to reduce a load on the query processing for the lower nodes 300.

Figure 8:
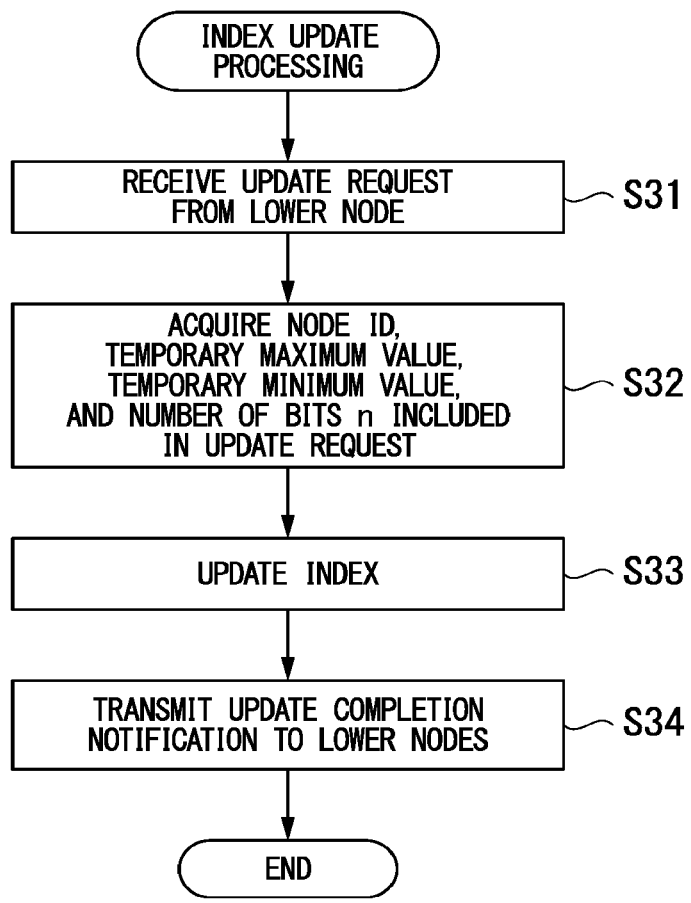
FIG. 8 is a flowchart for describing details of index update processing according to the first embodiment.

FIG. 8 is a flowchart for describing details of index update processing according to the first embodiment. Index update processing illustrated in FIG. 8 is executed by the upper node 200.

First, when receiving an update request for updating an index from the lower node 300 (S31), the upper node 200 acquires a node ID, a temporary maximum value, a temporary minimum value, and the number of precision ignoring bits n included in the update request (S32).

Subsequently, the upper node 200 updates a record of the table T1 corresponding to the node ID included in the update request using the temporary maximum value, the temporary minimum value, and the number of precision ignoring bits n included in the update request (S33). Thus, the table T1 (index) is updated. Subsequently, an update completion notification is transmitted to the lower nodes 300 (S34) and the process according to this flowchart ends.

Figure 9:
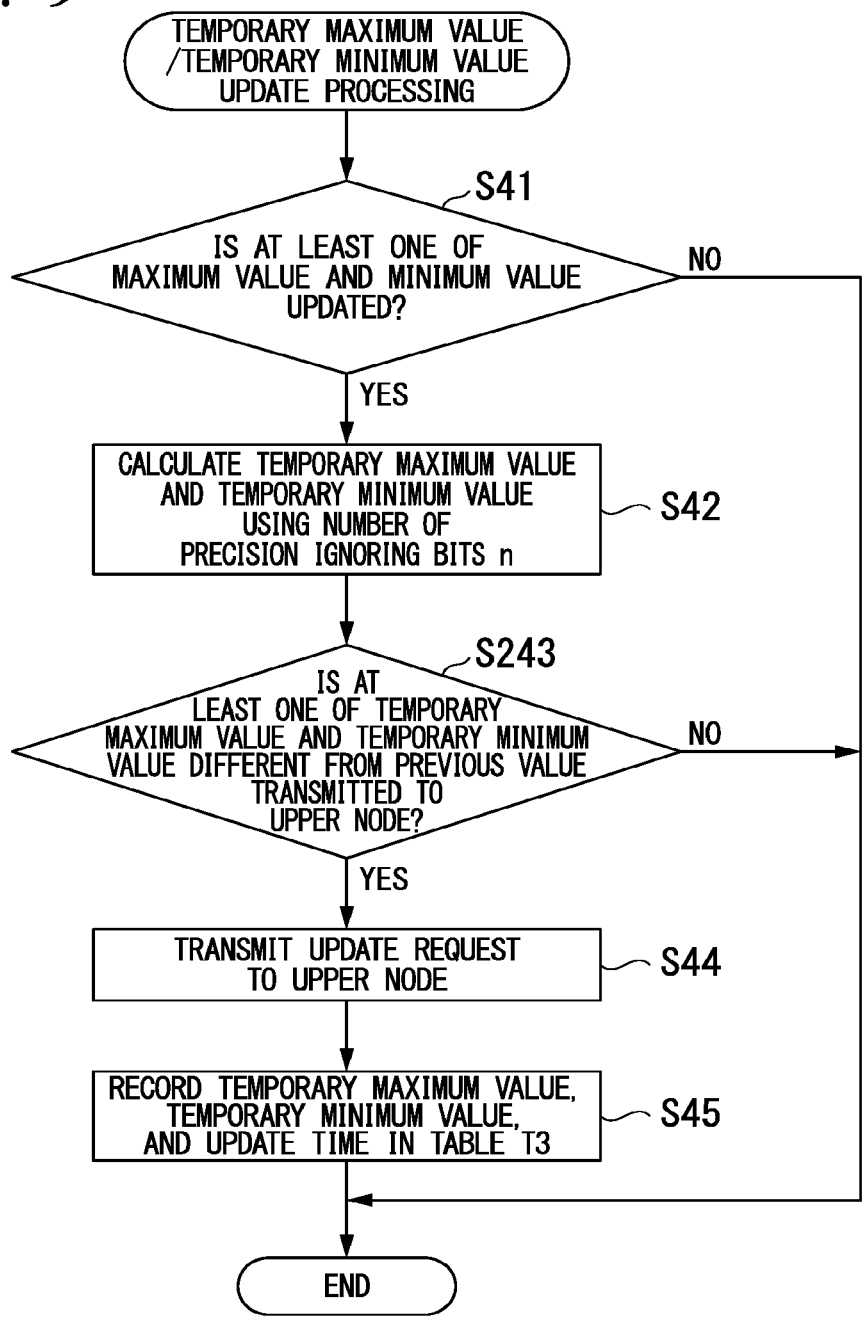
FIG. 9 is a flowchart for describing details of temporary maximum value/temporary minimum value update processing according to the first embodiment.

FIG. 9 is a flowchart for describing details of temporary maximum value/temporary minimum value update processing according to the first embodiment. The temporary maximum value/temporary minimum value update processing illustrated in FIG. 9 is executed by the lower node 300 when a record is added to the table T1 stored in the storage 350.

First, the lower node 300 determines whether at least one of a maximum value and a minimum value of a sensor value in the table T1 is updated when the record is added to the table T1 (S41). The lower node 300 ends the process according to this flowchart when it is determined that neither the maximum value nor the minimum value of the sensor value in the table T1 is updated.

On the other hand, the lower node 300 calculates the temporary maximum value and the temporary minimum value using the number of precision ignoring bits n when it is determined that the at least one of the maximum value and the minimum value of the sensor value in the table T1 is updated (S42). As described above, the lower node 300 calculates the temporary maximum value and the temporary minimum value when rounding processing is performed on the maximum value and the minimum value of the sensor value in the table T1.

Subsequently, the lower node 300 determines whether at least one of the temporary maximum value and the temporary minimum value is different from a previous value transmitted to an upper node (S43). The lower node 300 ends the process according to this flowchart when it is determined that both of the temporary maximum value and the temporary minimum value are the same as the previous value transmitted to the upper node.

On the other hand, the lower node 300 transmits an update request for updating the index (the table T2) stored in the storage 230 in the upper node 200 to the upper node 200 when it is determined that the at least one of the temporary maximum value and the temporary minimum value is different from the previous value transmitted to the upper node (S44).

As described above, the upper node 200 updates the index (the table T2) stored in the storage 230 on the basis of the update request received from the lower node 300. When the update of the index is completed, the upper node 200 transmits an update completion notification to the lower node 300.

The lower node 300 records the temporary maximum value and the temporary minimum value calculated in S42 in the table T3 (index update history) stored in the storage 350 together with an update time when receiving the update completion notification from the upper node 200 (S45) and ends the process according to this flowchart.

In this way, the lower node 300 calculates the temporary maximum value and the temporary minimum value when the maximum value and the minimum value of the sensor value held in the lower node 300 are updated. The lower node 300 does not transmit an update request to the upper node 200 when it is determined that at least one of the calculated temporary maximum value and temporary minimum value is the same as a previously calculated value (the previous value transmitted to the upper node 200). Thus, it is possible to reduce a load on the processing in the upper node 200.

Figure 10:
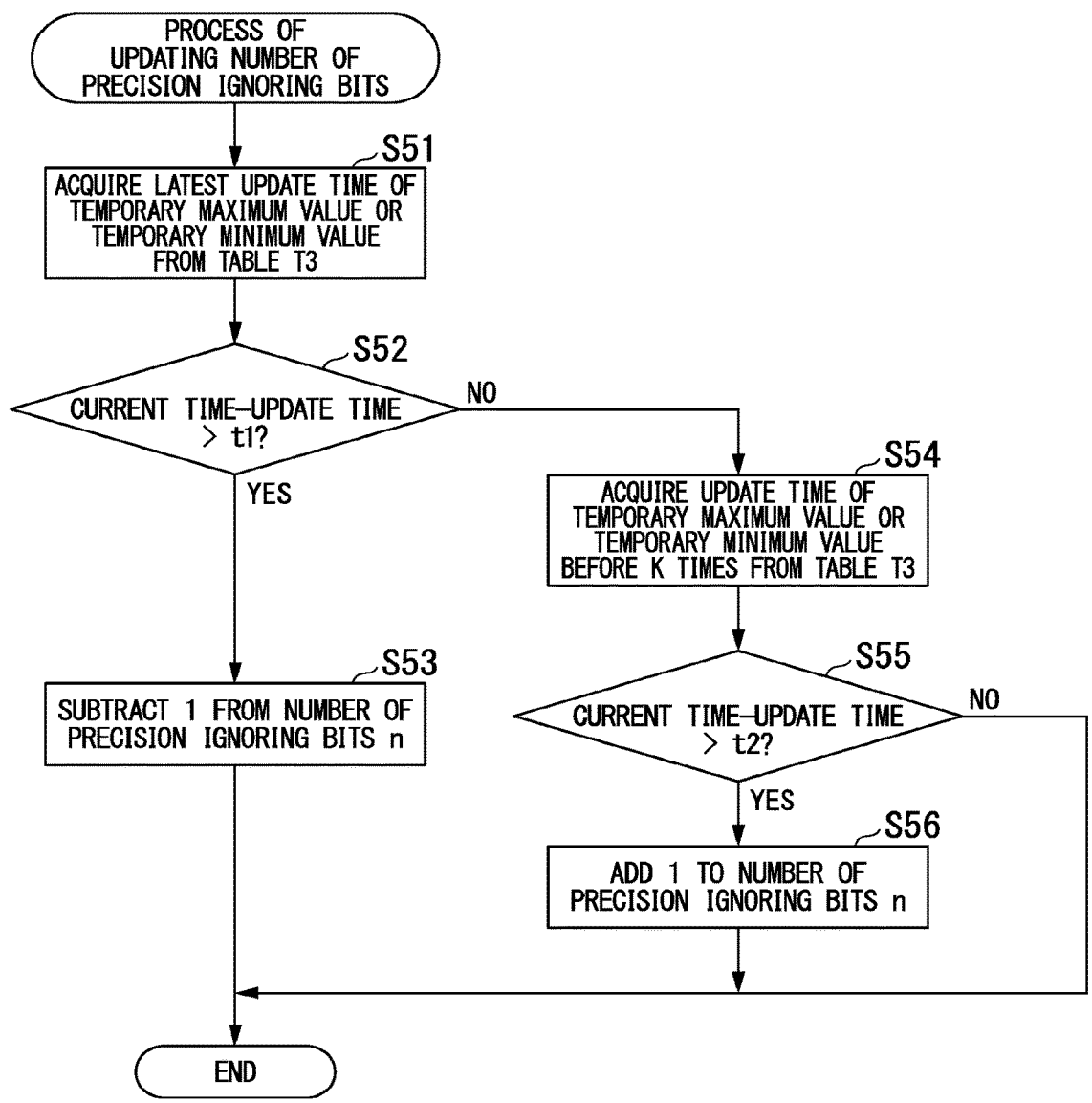
FIG. 10 is a flowchart for describing details of a process of updating the number of precision ignoring bits n according to the first embodiment.

FIG. 10 is a flowchart for describing details of a process of updating the number of precision ignoring bits n according to the first embodiment. The process of updating the number of precision ignoring bits n illustrated in FIG. 10 is executed periodically by the lower node 300.

First, the lower node 300 acquires the latest update time of the temporary maximum value or the temporary minimum value from the table T3 stored in the storage 350 (S51). Subsequently, the lower node 300 determines whether a difference between the current time and the update time acquired in S51 exceeds a predetermined time t1 (S52).

The predetermined time t1 is a fixed value, but the present invention is not limited thereto. For example, the predetermined time t1 may be determined by a function f(n) which has the number of precision ignoring bits n as an input and outputs a larger value when the number of precision ignoring bits n is smaller. For example, f(n)=(32−n)×30 [sec] may be adopted when the sensor value is 32 bits. Thus, the lower node 300 can set an appropriate predetermined time t1 on the basis of the number of precision ignoring bits n.

The lower node 300 subtracts 1 from the number of precision ignoring bits n when it is determined that the difference between the current time and the update time acquired in S51 exceeds the predetermined time t1 (S53) and ends the process according to this flowchart.

In this way, the lower node 300 reduces the number of precision ignoring bits n used for the rounding processing when the temporary maximum value or the temporary minimum value is not updated for the predetermined time t1. In other words, the lower node 300 reduces the number of precision ignoring bits n when an index update frequency is low. When the number of precision ignoring bits n is reduced, the temporary maximum value approaches a true maximum value and the temporary minimum value approaches a true minimum value. Thus, it is possible to prevent a lower node 300 which does not hold data to be retrieved for the query from performing the query processing (false positive) and it is possible to reduce a load on the query processing for the lower nodes 300.

On the other hand, in S52, the lower node 300 acquires an update time of the temporary maximum value or the temporary minimum value before k times from the table T3 stored in the storage 350 when it is determined that the difference between the current time and the update time acquired in S51 does not exceed the predetermined time t1 (S54). Subsequently, the lower node 300 determines whether the difference between the current time and the update time acquired in S54 exceeds a predetermined time t2 (S55). The predetermined time t2 may be a fixed value.

The lower node 300 adds 1 to the number of precision ignoring bits n when it is determined that the difference between the current time and the update time acquired in S54 exceeds the predetermined time t2 (S56) and ends the process according to this flowchart.

In this way, the lower node 300 increases the number of precision ignoring bits n used for the rounding processing when the temporary maximum value or the temporary minimum value is updated beyond the predetermined number of times k for the predetermined time t2. In other words, the lower node 300 increases the number of precision ignoring bits n when an index update frequency is high. Thus, it is possible to reduce a load on the index update processing due to the upper node 200.

On the other hand, in S55, the lower node 300 ends the process according to this flowchart when it is determined that the difference between the current time and the update time acquired in S54 does not exceed the predetermined time t2.

In the flowchart illustrated in FIG. 10, the lower node 300 increases the number of precision ignoring bits n used for the rounding processing when the temporary maximum value or the temporary minimum value is updated beyond the predetermined number of times k for the predetermined time t2, but the present invention is not limited thereto. For example, the lower node 300 may increase the number of precision ignoring bits n used for the rounding processing when the temporary maximum value or the temporary minimum value is continuously updated for a predetermined time t3 and continuously exceeds the predetermined number of times m. Thus, it is possible for the lower node 300 to reduce the processing load due to the update of the index and to prevent the deterioration of the performance of the database management system 10.

As described above, the database management system 10 according to the first embodiment includes the upper node 200 and the plurality of lower nodes 300. The upper node 200 receives a query which requests data from the client terminal 100 and transmits the received query to any one of the plurality of lower nodes 300 in accordance with conditions. The plurality of lower nodes 300 execute each processing based on the query received from the upper node 200 to acquire data and transmit the acquired data to the upper node 200. The upper node 200 holds an index indicating a range of data held in the lower node 300 and does not transmit the query to the lower nodes 300 when a range of data to be retrieved for the query is not the range indicated by the index. Thus, the database management system 10 can prevent the performance of the database management system from deteriorating even when a data update frequency of held in the lower node is high.

Second Embodiment

A second embodiment will be described below. In the first embodiment, the upper node 200 performs a process of receiving a query for designating a range of data to be retrieved. On the other hand, in the second embodiment, an upper node 200 receives a query for obtaining a maximum value or a minimum value in addition to a query for designating a range of data to be retrieved. The second embodiment will be described in detail below.

Figure 11:
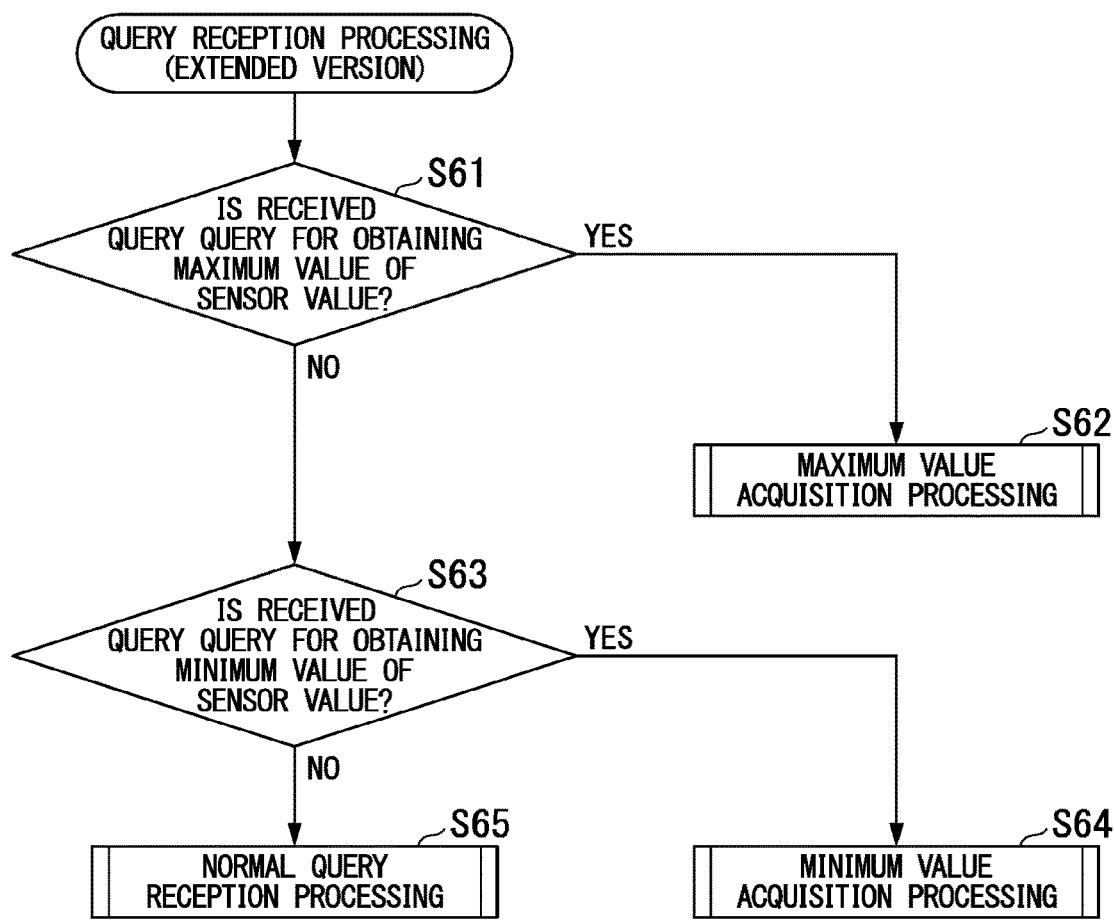
FIG. 11 is a flowchart for describing details of query reception processing (extended version) according to a second embodiment.

FIG. 11 is a flowchart for describing details of query reception processing (extended version) according to the second embodiment. The query reception processing illustrated in FIG. 11 is performed by the upper node 200 when the upper node 200 receives a query from a client terminal 100.

First, the upper node 200 determines whether a query received from the client terminal 100 is a query for obtaining a maximum value of a sensor value (S61). The upper node 200 performs maximum value acquisition processing which will be described later when it is determined that the query received from the client terminal 100 is the query for obtaining the maximum value of the sensor value (S62).

On the other hand, in S61, the upper node 200 determines whether the query received from the client terminal 100 is a query for obtaining a minimum value of the sensor value when it is determined that the query received from the client terminal 100 is not the query for obtaining the maximum value of the sensor value (S63). The upper node 200 performs minimum value acquisition processing which will be described later when it is determined that the query received from the client terminal 100 is the query for obtaining the minimum of the sensor value (S64).

On the other hand, in S63, the upper node 200 performs normal query reception processing when it is determined that the query received from the client terminal 100 is not the query for obtaining the minimum value of the sensor value (S65). Here, the normal query reception processing is the query reception processing according to the first embodiment illustrated in FIG. 7.

Figure 12:
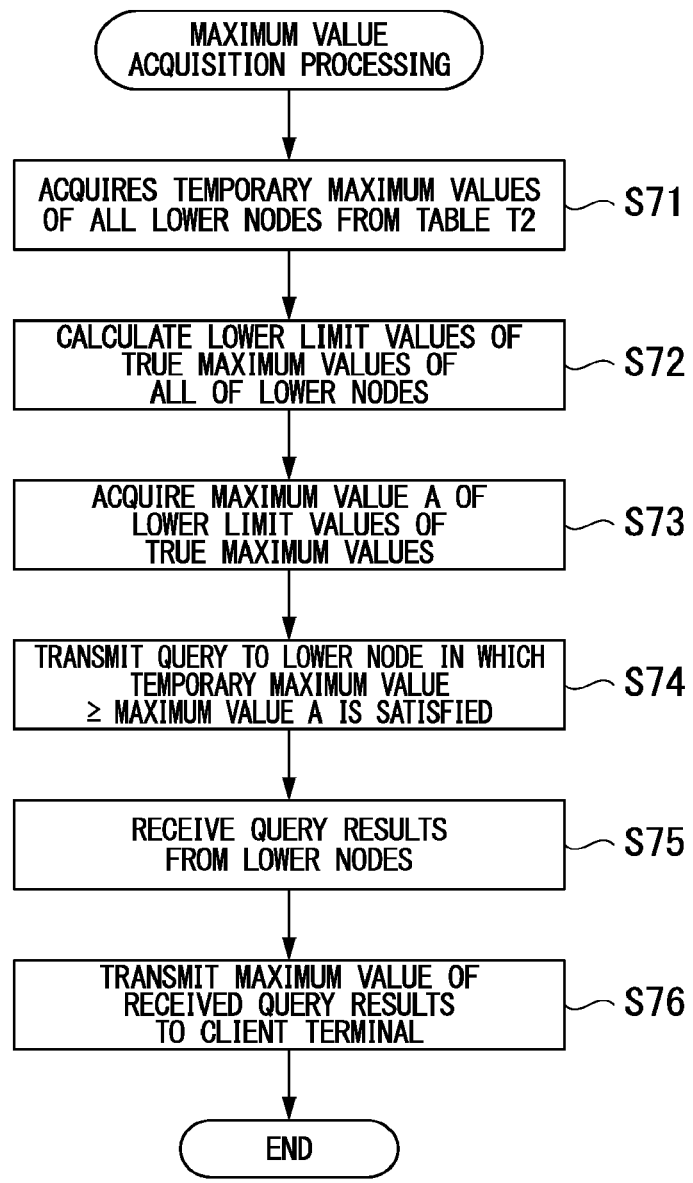
FIG. 12 is a flowchart for describing details of maximum value acquisition processing according to the second embodiment.

FIG. 12 is a flowchart for describing details of maximum value acquisition processing according to the second embodiment. The maximum value acquisition processing illustrated in FIG. 12 corresponds to S62 in FIG. 11 and is performed by the upper node 200.

First, the upper node 200 acquires temporary maximum values of all lower nodes 300 connected to the upper node 200 from a table T2 stored in a storage 230 (S71). Subsequently, the upper node 200 calculates lower limit values of true maximum values of all of the lower nodes 300 (S72).

In S72, when the number of precision ignoring bits is n, the upper node 200 calculates the lower limit values of the true maximum values by subtracting 1 from the temporary maximum values and setting $2^{th}$ to $n^{th}$ bits to 0. For example, when the temporary maximum values are 11100000 and the number of precision ignoring bits n is 5, the upper node 200 calculates 11000001 as the lower limit values of the true maximum values.

Subsequently, the upper node 200 acquires a maximum value of the lower limit values of the plurality of true maximum values calculated in the plurality of lower nodes 300 as a maximum value A (S73). The upper node 200 transmits a query to a lower node 300 in which the temporary maximum value is the maximum value A or more among the plurality of lower nodes 300 connected to the upper node 200 (S74). The lower node 300 which has received the query from the upper node 200 acquires a query result by performing the query processing. The lower node 300 transmits the query result to the upper node 200.

Subsequently, the upper node 200 receives the query results from the lower nodes 300 (S75). The upper node 200 transmits a maximum value of the query results received from the lower nodes 300 to the client terminal 100 (S76) and ends the process according to this flowchart.

In this way, the upper node 200 can narrow down candidates for the lower node 300 which holds a maximum value of a sensor value to be retrieved for the query by comparing the temporary maximum value and the maximum value A. For this reason, it is possible to prevent a lower node 300 which does not hold a maximum value of a sensor value from performing the query processing and to reduce a load on the query processing for the lower nodes 300.

Figure 13:
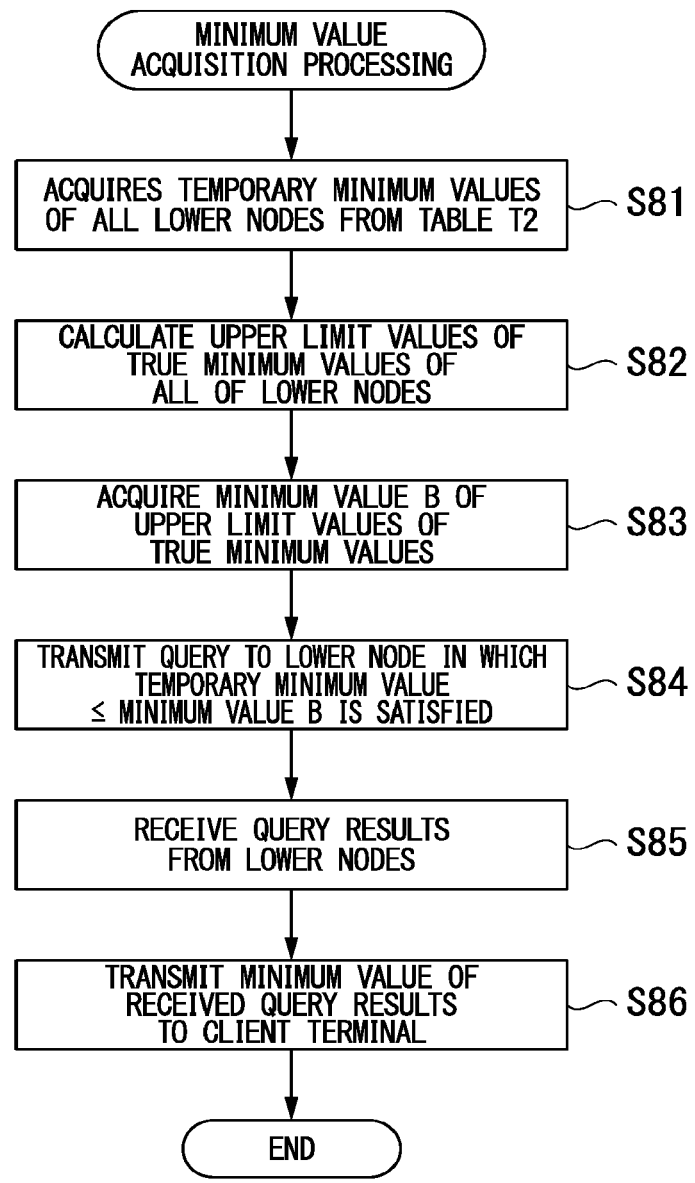
FIG. 13 is a flowchart for describing details of minimum value acquisition processing according to the second embodiment.

FIG. 13 is a flowchart for describing details of minimum value acquisition processing according to the second embodiment. The minimum value acquisition processing illustrated in FIG. 13 corresponds to S64 in FIG. 11 and is performed by the upper node 200.

First, the upper node 200 acquires temporary minimum values of all of the lower nodes 300 connected to the upper node 200 from the table T2 stored in the storage 230 (S81). Subsequently, the upper node 200 calculates upper limit values of true minimum values of all of the lower nodes 300 (S82).

In S82, when the number of precision ignoring bits is n, the upper node 200 calculates the upper limit values of the true minimum values by setting $1^{th}$ to $n^{th}$ bits of the temporary minimum values. For example, when the temporary minimum values are 00100000 and the number of precision ignoring bits n is 5, the upper node 200 calculates 00111111 as the upper limit values of the true minimum values.

Subsequently, the upper node 200 acquires a minimum value of the upper limit values of the plurality of true minimum values calculated in the plurality of lower nodes 300 as a minimum value B (S83). The upper node 200 transmits a query to a lower node 300 in which the temporary minimum value is the minimum value B or less among the plurality of lower nodes 300 connected to the upper node 200 (S84). The lower node 300 which has received the query from the upper node 200 acquires a query result by performing the query processing. The lower node 300 transmits the query result to the upper node 200.

Subsequently, the upper node 200 receives the query results from the lower nodes 300 (S85). The upper node 200 transmits a minimum value of the query results received from the lower nodes 300 to the client terminal 100 (S86) and ends the process according to this flowchart.

In this way, the upper node 200 can narrow down candidates for the lower node 300 which holds a maximum value of a sensor value to be retrieved for the query by comparing the temporary minimum value and the minimum value B. For this reason, it is possible to prevent a lower node 300 which does not hold a minimum value of a sensor value from performing the query processing and to reduce a load on the query processing for the lower nodes 300.

As described above, in the second embodiment, the lower node 300 transmits the update request including the number of precision ignoring bits n used for the rounding processing to the upper node 200 in addition to the temporary maximum value and the temporary minimum value. Thus, the upper node 200 can calculate the true maximum value and the true minimum value of the sensor value using the number of precision ignoring bits n included in the update request.

Also, in the second embodiment, the upper node 200 calculates the lower limit value of the true maximum value for each of the plurality of lower nodes 300 on the basis of the temporary maximum value when receiving the query for requesting the maximum value of the data held in the plurality of lower nodes 300. The upper node 200 compares the maximum value A of the calculated lower limit value of the true maximum value for each of the plurality of lower nodes 300 and the temporary maximum value for each of the plurality of lower nodes 300. The upper node 200 transmits the query only to the lower node 300 in which the temporary maximum value is the maximum value A Of more. Thus, it is possible to reduce a load on processing in the lower nodes 300.

In addition, in the second embodiment, the upper node 200 calculates the upper limit value of the true minimum value for each of the plurality of lower nodes 300 on the basis of the temporary minimum value when receiving the query for requesting the minimum value of the data held in the plurality of lower nodes 300. The upper node 200 compares the minimum value B of the calculated upper limit value of the true minimum value for each of the plurality of lower nodes 300 and the temporary minimum value for each of the plurality of lower nodes 300. The upper node 200 transmits the query only to the lower node 300 in which the temporary minimum value is the minimum value B or less. Thus, it is possible to reduce a load on processing in the lower nodes 300.

Test results associated with the embodiments will be described below. The applicant carried out tests under the following conditions.

One million pieces of 32-bit data (random numbers) were sequentially input to a storage 350.

The number of upper limits of the number of pieces of data stored in the storage 350 was 100 and data was deleted from the oldest data.

In this case, the number of times of updating the maximum value and the minimum value of the sensor value was 39656. On the other hand, the number of times of updating the temporary minimum value was 2727, the number of times of updating the temporary maximum value was 2663, and the total value of these was 5390. For this reason, according to this embodiment, it was possible to reduce the number of times of updating the index by 86.4% compared with a case in which an index was updated each time at least one of the maximum value and the minimum value was updated. Furthermore, the probability of the occurrence of the false positive was 1.7%. In this way, according to the present invention, it is possible to reduce the number of times of updating the index and to minimize the occurrence of the false positive.

According to at least one of the above-described embodiments, the database management system 10 includes the upper node 200 and the plurality of lower nodes 300. The upper node 200 receives a query for requesting data from the client terminal 100 and transmits the received query to any one of the plurality of lower nodes 300 in accordance with the conditions. Each of the plurality of lower nodes 300 performs processing based on the query received from the upper node 200 to acquire data and transmits the acquired data to the upper node 200. The upper node 200 holds an index indicating a range of data held in the lower node 300 and does not transmit the query to the lower nodes 300 when a range of data to be retrieved for the query is not the range indicated by the index. Thus, the database management system 10 can prevent the performance of the database management system from deteriorating even when a data update frequency held in a lower node is high.

In the first embodiment and the second embodiment, data to be retrieved for the query is assumed to be a sensor value, but the present invention is not limited thereto. For example, data to be retrieved for the query may be text data as long as the data to be retrieved for the query can define a magnitude relationship. Furthermore, in the first embodiment and the second embodiment, the rounding processing is assumed to be performed using the number of precision ignoring bits n, but the present invention is not limited thereto. For example, when the data to be retrieved for the query is two-dimensional data, a region on a two-dimensional plane (for example, a rectangular region) may be used as an index. For this reason, the upper node 200 may hold a range wider than a range of data held in the lower node 300 as range information (index) of data held in the lower node 300.

Also, in the first embodiment and the second embodiment, the client terminal 100, the upper node 200, and the plurality of lower nodes 300 are assumed to be connected to each other through a tree type network, but the present invention is not limited thereto. For example, the client terminal 100, the upper node 200, and the plurality of lower nodes 300 may be connected to each other through a mesh type network.

While several embodiments of the present invention have been described, these embodiments have been presented by way of examples and are not intended to limit the scope of the invention. These embodiments can be implemented in various other modes and various omissions, substitutions, and changes are possible without departing from the gist of the invention. These embodiments and modifications thereof are included in the scope and gist of the invention as well as within the scope of the invention described in the claims and their equivalents.

REFERENCE SIGNS LIST

10 Database management system
100 Client terminal

200 Upper node
210 Query executor
220 Index manager
230 Storage
240 Communicator
300 Lower node
310 Communicator
320 Query executor
330 Table manager
340 Index manager
350 Storage
360 Index notification determiner
361 Update frequency determiner

The invention claimed is:

1. A database management system comprising:
a first node configured to receive a query for requesting data from a client terminal and to transmit the received query to any one of a plurality of second nodes in accordance with conditions; and
the plurality of second nodes configured to acquire data by performing processing based on the query received from the first node and to transmit the acquired data to the first node,
wherein the first node holds range information indicating a range of data held in each of the second nodes and does not transmit the query to the second nodes when the range of data to be retrieved for the query is not a range indicated by the range information,
wherein the range information includes temporary maximum values and temporary minimum values of data held in the second nodes,
wherein the second nodes each calculate the temporary maximum values by carrying up low-order n bits of maximum value of the data held in the second nodes, calculate the temporary minimum values by rounding down low-order n bits of minimum values of the data held in the second nodes as rounding processing using a preset number of bits n, and transmit an update request including the temporary maximum values and the temporary minimum values to the first node, and
wherein the first node sets a temporary maximum value and a temporary minimum value included in the update request in the range information when receiving the update request from the second node.

2. The database management system according to claim 1, wherein the second node calculates the temporary maximum value and the temporary minimum value when the maximum value and the minimum value of the data held in the second node are updated and does not transmit the update request to the first node when at least one of the calculated temporary maximum value and temporary minimum value is the same as a previously calculated value.

3. The database management system according to claim 1, wherein the second node transmits the update request including the number of bits n used for the rounding processing to the first node in addition to the temporary maximum value and the temporary minimum value.

4. The database management system according to claim 1, wherein the second node decreases the number of bits n used for the rounding processing when the temporary maximum value or the temporary minimum value is not updated for a predetermined time t1.

5. The database management system according to claim 4, wherein the predetermined time t1 is determined through a function f(n) which has the number of bits n as an input and outputs a larger value when the number of bits n is smaller.

6. The database management system according to claim 1, wherein the second node increases the number of bits n used for the rounding processing when the temporary maximum value or the temporary minimum value is updated beyond a predetermined number of times k for a predetermined time t2.

7. The database management system according to claim 1, wherein the second node increases the number of bits n used for the rounding processing when the temporary maximum value or the temporary minimum value is continuously updated for a predetermined time t3 and continuously exceeds a predetermined number of times m.

8. The database management system according to claim 1, wherein the first node is configured to:
calculate lower limit values of true maximum values on the basis of the temporary maximum value for each of the plurality of second nodes when receiving a query for requesting maximum values of data held in the plurality of second nodes,
compare a maximum value of the calculated lower limit values of the true maximum values for each of the plurality of second nodes with the temporary maximum value for each of the plurality of second nodes, and
transmit the query only to the second node in which the temporary maximum value is the maximum value or more of the lower limit values of the true maximum values.

9. The database management system according to claim 1, wherein the first node is configured to:
calculate upper limit values of true minimum values on the basis of the temporary minimum value for each of the plurality of second nodes when receiving a query for requesting minimum values of data held in the plurality of second nodes,
compare a minimum value of the calculated upper limit values of the true minimum values for each of the plurality of second nodes with the temporary minimum value for each of the plurality of second nodes, and
transmit the query only to the second node in which the temporary minimum value is the minimum value or less of the upper limit values of the true minimum values.

* * * * *